(12) United States Patent
Pauliat et al.

(10) Patent No.: US 7,944,793 B2
(45) Date of Patent: May 17, 2011

(54) HOLOGRAPHIC STORAGE WITH HOMODYNE DETECTION

(75) Inventors: Gilles Pauliat, Marcoussis (FR);
Guillaume Maire, Epinal (FR); Gerald Roosen, La Celle-les-Bordes (FR)

(73) Assignees: Centre National de la Recherche Scientifique - CNRS (FR); Universite Paris SUD (FR)

( * ) Notice: Subject to any disclaimer, the term of this patent is extended or adjusted under 35 U.S.C. 154(b) by 599 days.

(21) Appl. No.: 11/793,157

(22) PCT Filed: Dec. 20, 2005

(86) PCT No.: PCT/FR2005/003208
§ 371 (c)(1),
(2), (4) Date: Oct. 3, 2007

(87) PCT Pub. No.: WO2006/067331
PCT Pub. Date: Jun. 29, 2006

(65) Prior Publication Data
US 2008/0130461 A1 Jun. 5, 2008

(30) Foreign Application Priority Data
Dec. 20, 2004 (FR) .................................... 04 53091

(51) Int. Cl.
*G11B 7/004* (2006.01)
(52) U.S. Cl. .......................................... 369/103; 359/1
(58) Field of Classification Search .................. 369/103; 359/1, 3, 10; 365/125, 216
See application file for complete search history.

(56) References Cited

U.S. PATENT DOCUMENTS

| 5,212,572 | A | * | 5/1993 | Krantz et al. | 369/112.1 |
| 5,684,588 | A | * | 11/1997 | Khoury et al. | 356/458 |
| 5,900,935 | A | * | 5/1999 | Klein et al. | 356/502 |
| 6,262,818 | B1 | * | 7/2001 | Cuche et al. | 359/9 |
| 2002/0150022 | A1 | * | 10/2002 | Tolmachev | 369/103 |
| 2003/0147112 | A1 | * | 8/2003 | Mukawa | 359/15 |
| 2003/0165746 | A1 | | 9/2003 | Stadler et al. | |

FOREIGN PATENT DOCUMENTS

| EP | 0 827 621 B1 | 1/2000 |
| EP | 1 324 322 A1 | 7/2003 |

* cited by examiner

*Primary Examiner* — Wayne R Young
*Assistant Examiner* — Thomas D Alunkal
(74) *Attorney, Agent, or Firm* — DLA Piper LLP (US)

(57) ABSTRACT

The invention concerns the field of holographic storage units. More particularly, the invention concerns the field of holographic storage units used for bit-by-bit storage of information. It concerns a method for reading data recorded in a holographic material in the form of a hologram obtained by interference of two beams of substantially the same wavelength, and using at least one reflecting layer. The invention is characterized in that it includes the following steps: emitting a light comprising at least said wavelength at said holographic material comprising said hologram; performing a homodyne detection between the signal resulting from the first light diffracted by said hologram and at least one signal selected between the reflected signal and the signal transmitted by said at least one reflecting layer.

4 Claims, 6 Drawing Sheets

HOLOGRAPHIC STORAGE WITH HOMODYNE DETECTION

RELATED APPLICATION

This is a §371 of International Application No. PCT/FR2005/003208, with an international filing date of Dec. 20, 2005 (WO 2006/067331 A1, published Jun. 29, 2006), which is based on French Patent Application No. 04/53091, filed Dec. 20, 2004.

TECHNICAL FIELD

This disclosure relates to the field of holographic storage devices, more particularly, to the field of holographic storage devices applied to storing information bit-by-bit.

BACKGROUND

For many applications, the capacities of current optical storage devices (CDs, DVDs, or even Blu-ray Discs) are very insufficient. Research is thus being conducted with the aim of achieving storage capacities on the order of one terabyte, whereas current discs offer 50 gigabytes at best.

To this end, in the prior art, optical mass storage devices are already known that use the principle of holography. This principle offers the great advantage of making 3D or volumetric data storage possible, instead of the mere 2D or surface data storage (or possibly multi-surface data storage) afforded by conventional discs of the DVD type. In particular, EP 0 827 621 describes an optical mass storage device having a light-sensitive layer with elementary cells, each of which is constituted of a light guide segment of the optical fiber type. The fibers then store a Lippmann structure constituting an interferogram of data encoded in the wavelengths of a light beam.

FIG. 1 of EP '621 illustrates, during writing of data, that light penetrates into the fiber, passes through a transparent substrate, and reaches a mirror which reflects the light back into the fiber. The light-sensitive material of the fiber is then subjected to the action of two beams that propagate in opposite directions. The interference patterns resulting from interference between the two beams then generate standing waves which inscribe in the light-sensitive material of the fiber a superposition of refractive index stratifications pursuant to the Lippmann effect.

During data reading, the mirror is masked, and the laser emits light having a continuous spectrum. Certain wavelengths are selectively reflected towards the laser and the detector by the Lippmann structure. Detection of that structure thus indicates presence of an information bit. By multiplexing various wavelengths in the fibers, it is then possible to obtain volumetric storage of a plurality of information bits.

It is easy to understand that the drawback lies in the fact that it is necessary to remove or to mask the mirror during reading to read the interference patterns. The technical problem presented is thus the problem of reading or of detecting interference patterns in a holographic mass storage device.

US 2002/150022 discloses using ultra-short pulses for recording information at a determined depth in the thickness of the material. The delay between two counter-propagating pulses defines the depth of recording. Interference patterns are used therein during the method for recording the information, but never during the method for reading the information. In that system, a mirror is present under a light-sensitive medium. That mirror (with the quarter-wave plate) has polarization properties so as to avoid mixing the beam reflected by the mirror with the same beams that encode the data that is read.

US 2003/165746 discloses a structure of a recording medium and a method for writing data on that medium.

EP 1 324 322 discloses the fact that, during writing, a reference beam reflected by a mirror is sent in a direction different from the direction of the reconstructed signal.

None of those publications discloses a step of reading data by homodyne detection.

SUMMARY

We provide a method for reading data recorded in a holographic material in the form of a hologram obtained by interference of two rays of substantially the same wavelength, and using at least one reflecting layer, including emitting a light comprising at least said wavelength at the holographic material comprising the hologram, and performing a homodyne detection between the signal from the light diffracted by the hologram, and at least one signal from the signal reflected by the at least one reflecting layer and the signal transmitted by the at least one reflecting layer.

BRIEF DESCRIPTION OF THE DRAWINGS

Our devices can be better understood with reference to the following figures which are given by way of illustration and in which.

DETAILED DESCRIPTION

We provide a method for reading data recorded in a holographic material in the form of a hologram obtained by interference of two beams of substantially the same wavelength, and using at least one reflecting layer, comprising:

emitting a light comprising at least the wavelength at the holographic material comprising the hologram; and performing a homodyne detection between the signal from the light diffracted by the hologram, and at least one signal chosen from the signal reflected by the at least one reflecting layer and the signal transmitted by the at least one reflecting layer.

Advantageously, the homodyne detection is performed differentially by using the reflected signal and the transmitted signal.

Advantageously, a birefringent phase plate placed between the holographic medium and the mirror makes it possible to optimize the operating point of the homodyne detection by means of a change in polarization of the read beam relative to the polarization of the write beam.

Advantageously, a birefringent phase plate placed between the holographic medium and the mirror makes it possible, by a change in polarization of the read beam relative to the write beam, to perform the homodyne detection differentially between the two polarization components of the transmitted and/or reflected beams.

We also provide a mass storage device comprising at least one holographic material for inscribing data bit-by-bit by generating a hologram, and at least one reflecting layer, the mass storage device being characterized in that the reflecting layer reflects the read signals during the read stages during which the recorded data is read.

Preferably, it further includes a phase plate adjusting the reflected and transmitted signals as a function of their polarizations.

The data may be recorded in micro-fibers oriented substantially perpendicularly to the recording face. The data may also be recorded on Lippmann discs by beams propagating substantially perpendicularly to the recording face.

We also provide an optical disc for recording data, the optical disc being characterized in that it constitutes a mass storage device.

We further provide a recording medium for recording data, the recording medium being characterized in that it constitutes a mass storage device.

Figure 1:
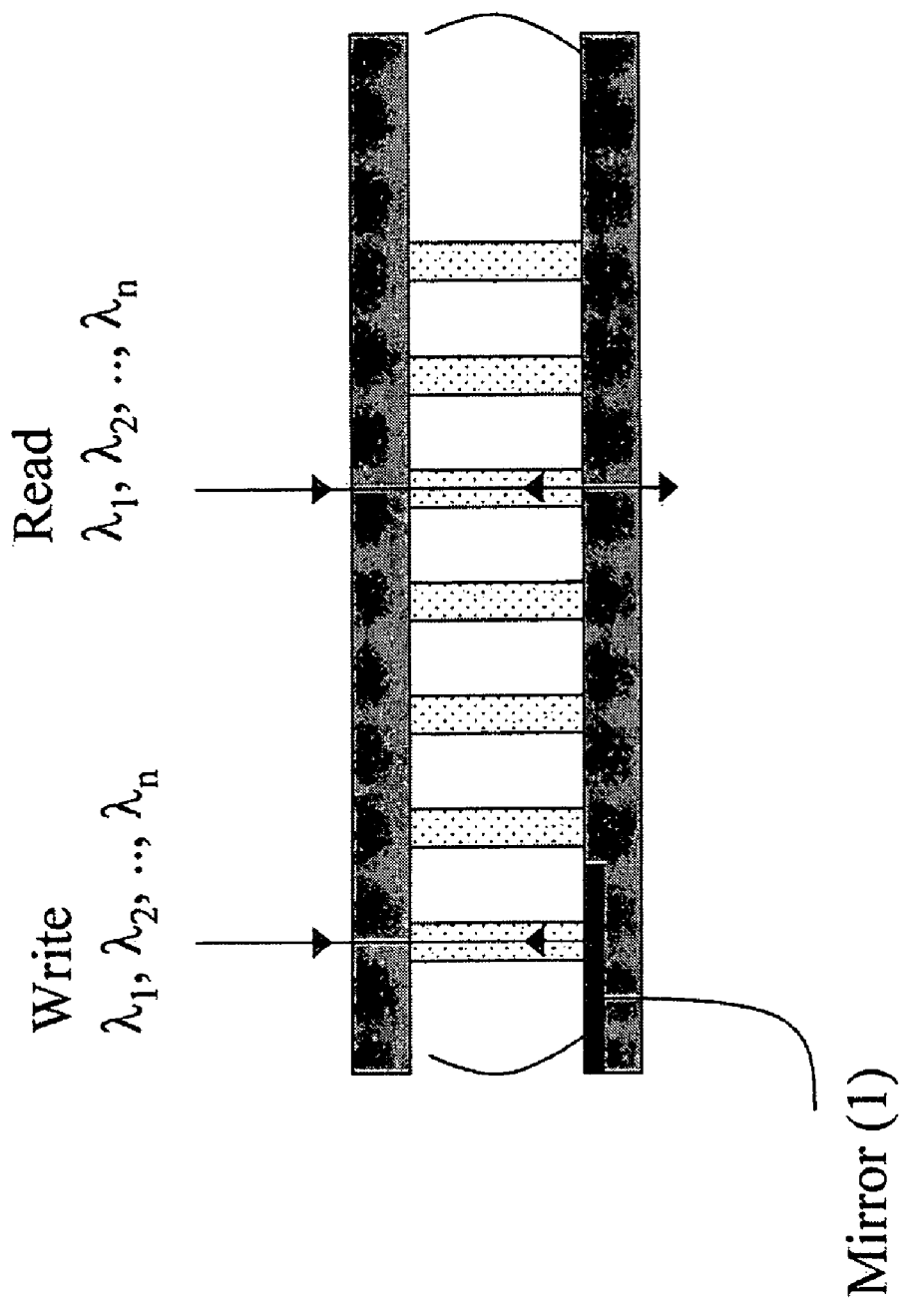
FIG. 1 schematically shows a prior art method for reading information recorded in the form of a hologram.

As shown in FIG. 1, in the prior art, the bits are recorded one-by-one, in the form of a Bragg grating, by counter-propagating beams. If the corresponding bit is at 1, a grating is recorded, whereas a grating is not recorded if the corresponding bit is at 0. A plurality of bits is thus stored in the same place by wavelength division multiplexing, either by exposure successively to each of the wavelengths, or by exposure simultaneously to all of the wavelengths. The operation is then repeated at another position to cover the entire disc.

The data is retrieved by Bragg diffraction: for a given position and a given wavelength, a diffracted signal indicates that the corresponding bit is at 1. Reading back can also be performed with a broad spectrum, all of the bits of the same location being retrieved simultaneously. In FIG. 1, the second write beam is generated by the first beam being reflected off a mirror 1. To read the data, the mirror is removed and the data is read by detecting the beam reflected by the grating.

Figure 2:
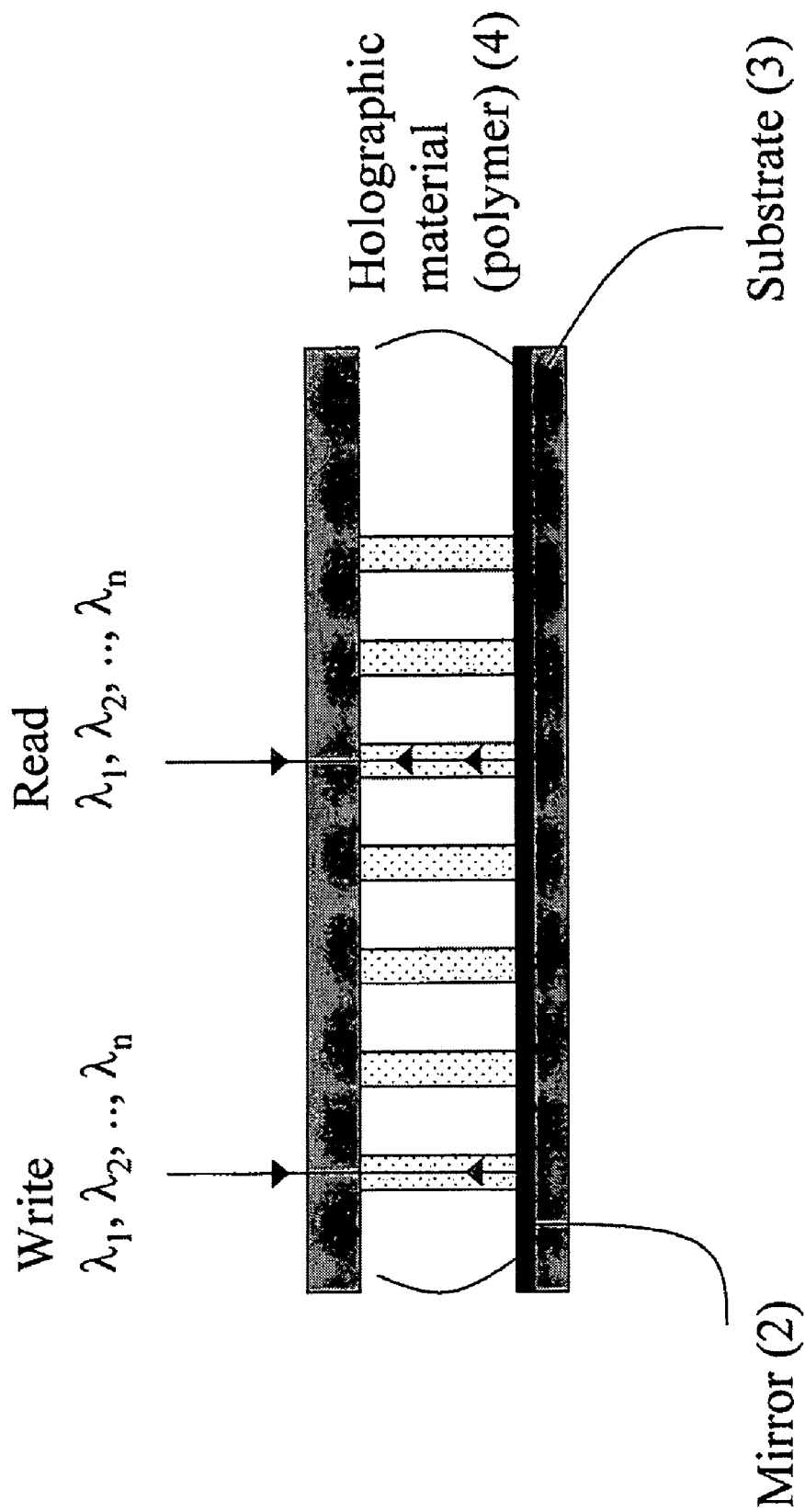
FIG. 2 schematically shows our method for reading.

In FIG. 2, and in accordance with our methods and devices, a mirror 2 is positioned in fixed manner at the substrate 3 of the mass storage device, e.g. in the form of a glass plate. The mirror is not removed or masked during reading of the data.

In which case, during retrieval, the diffracted signal is superposed coherently on the signal reflected by the mirror. If the reflectivity of the mirror is not 100%, and/or, if the holographic material 4 is absorbent, the presence of a bit at 1 results in a modification of the reflectivity of the structure as a function of the wavelength. In accordance with the invention, homodyne detection is then performed to recognize the bit.

The hologram can be a phase hologram and/or an absorption hologram.

Figure 3:
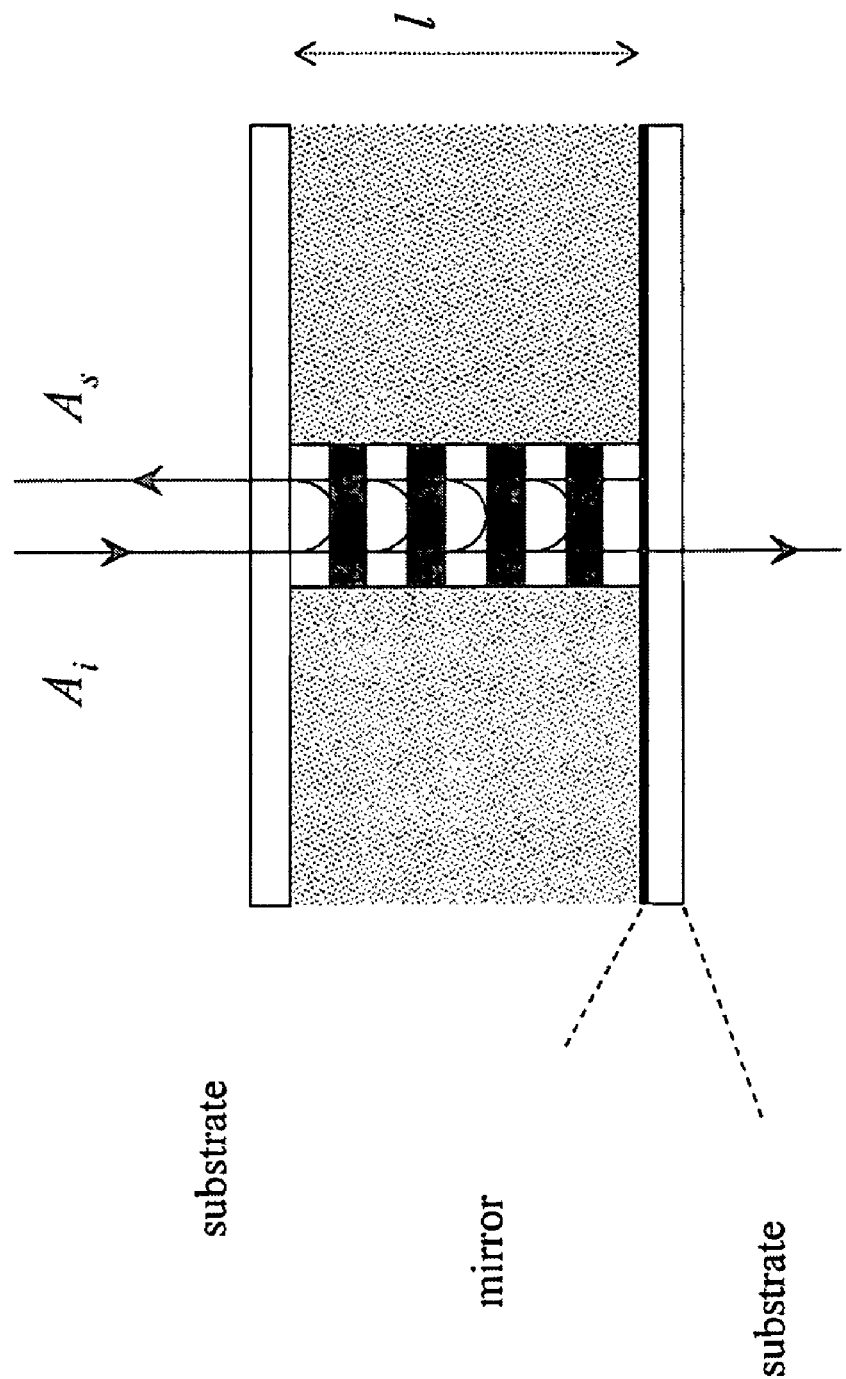
FIG. 3 shows the calculation of the signal detected by homodyne detection.

FIG. 3 makes it possible to understand the intensity obtained with homodyne detection.

The following notations are used:

r: reflectivity in amplitude of the mirror;
$k_m$: wave number at the recording wavelength of grating No. m;
k and $\omega$: wave number and angular frequency at the read wavelength;
$\delta n_{max}$: maximum variation in diffractive index of the material;
N: number of recorded gratings;
$\phi$: phase shift between index grating and interference pattern;
l: thickness of the holographic medium; and
$A_i$: incident amplitude.

By way of illustration, for a phase hologram of low diffraction efficiency, and for low reflectivities r, the amplitude $A_s$ detected by homodyne detection as in FIG. 3 is thus:

$$A_s = A_i e^{2ikl}\left(r + i\sum_{m=1}^{N} b_m \frac{\omega}{2c} \frac{\delta n_{max}}{N} \frac{2r}{1+r^2} l e^{-i(k-k_m)l - i\varphi} \operatorname{sinc}((k-k_m)l)\right)$$

where the coefficients $b_m$ are equal to 1 or 0 depending on whether the bit of the corresponding grating is at 1 or at 0, and where the first term of the sum corresponds to the reflected portion of the signal, and the second term corresponds to the diffracted portion.

Depending on the type of material used, the resulting intensity varies with the value of the parameter $\phi$. It should, in particular, be noted that the intensity of the signal obtained decreases in this example at 1/N with homodyne detection, whereas it decreases at $1/N^2$ with known detections for holographic storage devices.

Figure 4:
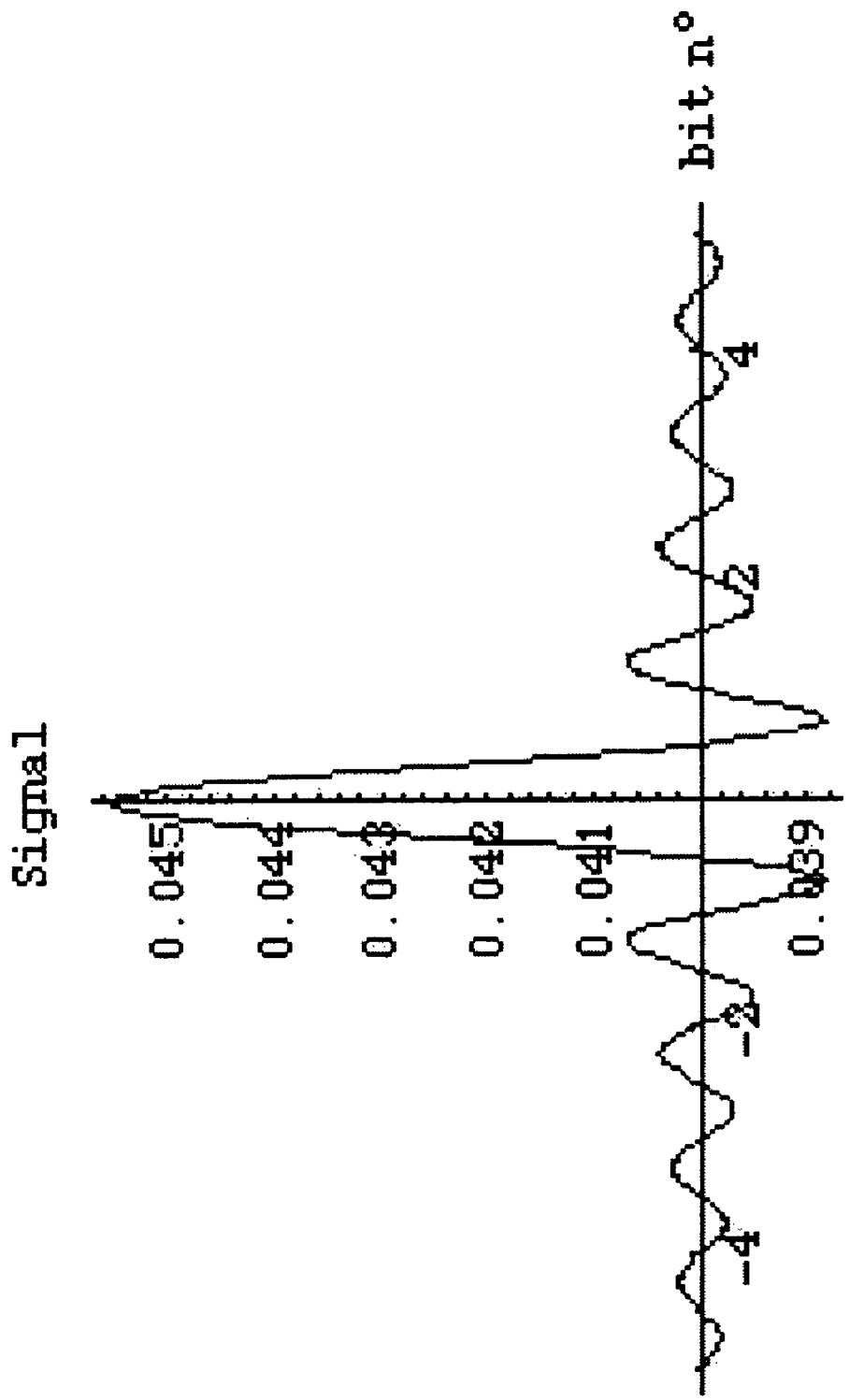
FIG. 4 shows a signal obtained for recording in a purely non-local material.

Thus, for a purely non-local holographic material, e.g., for a light-refractive crystal operating under diffusion conditions, the index grating is shifted by one quarter of a fringe relative to the interface pattern that served for the inscription ($\phi=+p/2$ or $-p/2$). For the wavelength that served for recording, the diffracted beam thus interferes constructively or destructively with the reflected beam. The intensity of the signal obtained is thus as shown in FIG. 4, as a function of the number of the bit or else of the difference in wave numbers $k-k_m$.

The detected signal has a maximum (or a minimum) for the Bragg wavelength, indicating that the corresponding bit is at level 1. It should also be noted that the transmitted signal has an opposite variation, with a minimum (or a maximum) for the Bragg wavelength, which also makes it possible to perform homodyne detection in transmission.

Figure 5:
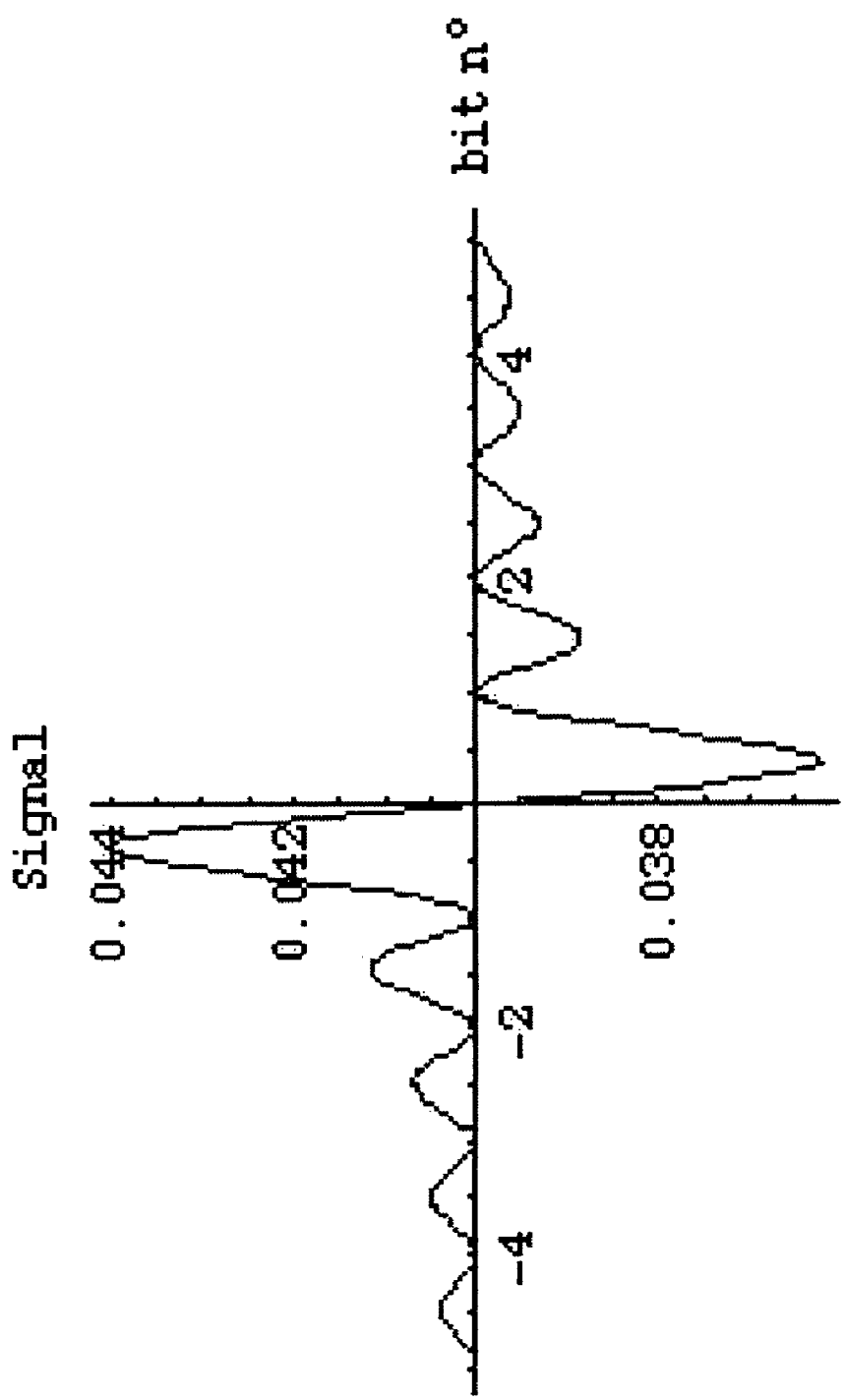
FIG. 5 shows a signal obtained for recording in a purely local material.

For a material having a local response, the index grating is in phase, or in phase opposition, with the interference pattern that served for the recording ($\phi=0$ or p). In which case, the signal detected by homodyne detection no longer presents a maximum (or a minimum) for the Bragg wavelength. This signal is shown in FIG. 5.

In which case, detection is possible, but it is preferred to put the diffracted signal artificially back into phase with the signal reflected via a $\lambda/8$ plate disposed between the holographic material and the mirror. Writing then takes place, for example, with the beam being linearly polarized along an axis of said plate so that the reflected beam has the same polarization. By turning the polarization through $\pi/2$ between reading and writing, a corrective phase shift is introduced on the reflected beam. For the Bragg wavelength, the signal as shown in FIG. 4 is thus retrieved.

It is also possible to perform differential detection between the transmitted beam and the reflected beam to improve the accuracy of the detection. The variation in the signal transmitted by the mirror whose reflectivity is not 100% is opposite from the variation in the signal reflected by the structure. The homodyne detection can thus be performed, as explained above, either on the transmitted signal, or on the reflected signal. By performing differential detection between these two signals, it is possible to overcome any fluctuations in power due to the source or to dust. The variations in the differential signal are thus due only to the hologram.

In one implementation, detection is performed on a single side of the mirror by detecting the two polarization components and inserting a phase plate for phase shifting one of the reflected polarization components and not the other one. In which case, writing is performed with the polarization along a neutral line of the plate. During reading, the polarization is aligned at 45° from the neutral lines. The two reflected components are this in quadrature relative to each other.

A description follows, more precisely, of the materials used for recording by a holographic storage device.

In one implementation, the bits are recorded one-by-one in micro-fibers such as those presented in EP 0 827 621. Such micro-fibers offer the advantage of guiding light during recording, and the recording capacity of the micro-fiber is then proportional to its length.

Figure 6:
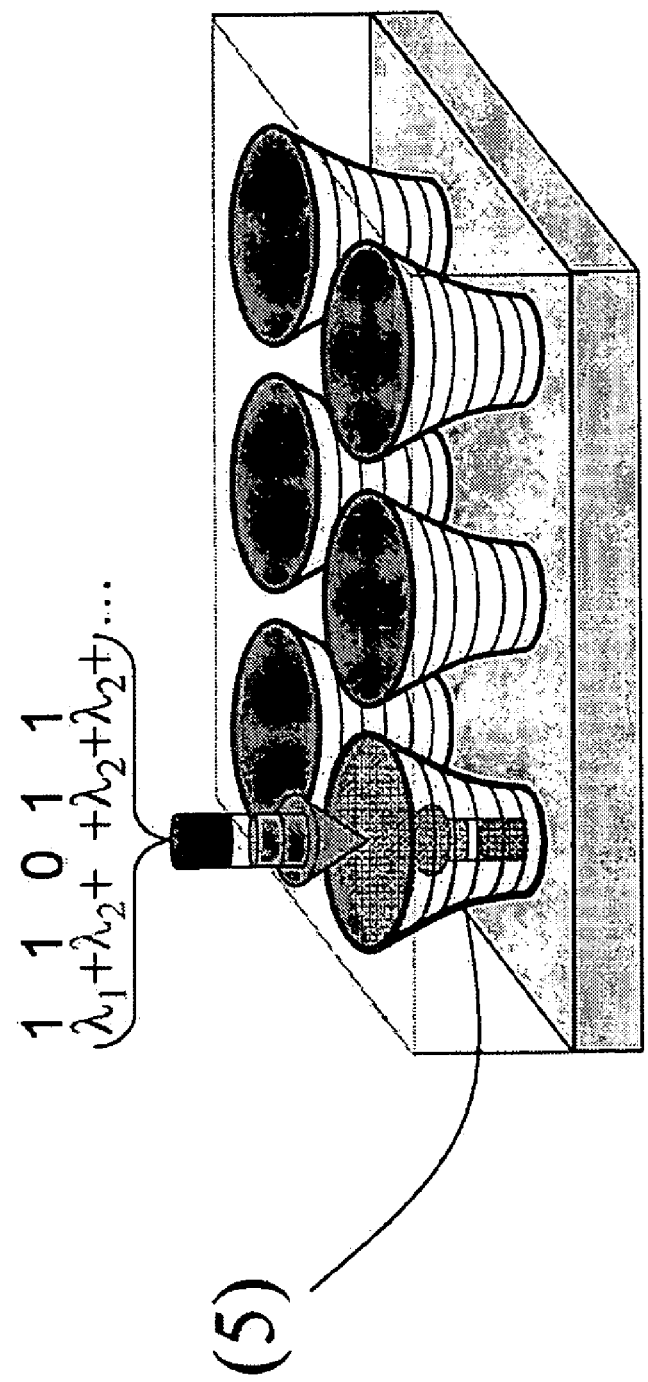
FIG. 6 shows recording bit-by-bit in Lippmann discs.

In another implementation, shown in FIG. 6, the bits are recorded in Lippmann discs 5 made of photopolymer. In which case, recording and reading take place as with micro-fibers. However, focusing is performed on the beam that remains not very divergent over the thickness of the material so as to multiplex as many wavelengths as possible over as small an area as possible, it being necessary for the thickness of the material to be of the order of the Beamleigh wavelength of the beam.

Although our methods and devices are described through examples given with reference to the accompanying figures, it is to be understood that numerous modifications can be made by those skilled in the art without going beyond the scope of the disclosed as defined in the appended claims.

The invention claimed is:

1. A method for reading data recorded in a holographic material in the form of a hologram obtained by interference of two rays of substantially the same wavelength, and using at least one reflecting layer, comprising:
    emitting a light comprising at least said wavelength at said holographic material comprising said hologram; and
    performing a homodyne detection comprising recombining a polarization component of the signal from said light diffracted by said hologram and at least one polarization component of one signal from the signal reflected by said at least one reflecting layer and the signal transmitted by said at least one reflecting layer.

2. The method according to claim 1, wherein said homodyne detection is performed differentially by using the reflected signal and the transmitted signal.

3. The method according to claim 1, wherein a birefringent phase plate placed between the holographic medium and the mirror makes it possible to optimize the operating point of said homodyne detection by means of a change in polarization of the read beam relative to the polarization of the write beam.

4. The method according to claim 1, wherein a birefringent phase plate placed between the holographic medium and the mirror makes it possible, by a change in polarization of the read beam relative to the write beam, to perform said homodyne detection differentially between the two polarization components of the transmitted and/or reflected beams.

\* \* \* \* \*